UNITED STATES PATENT OFFICE.

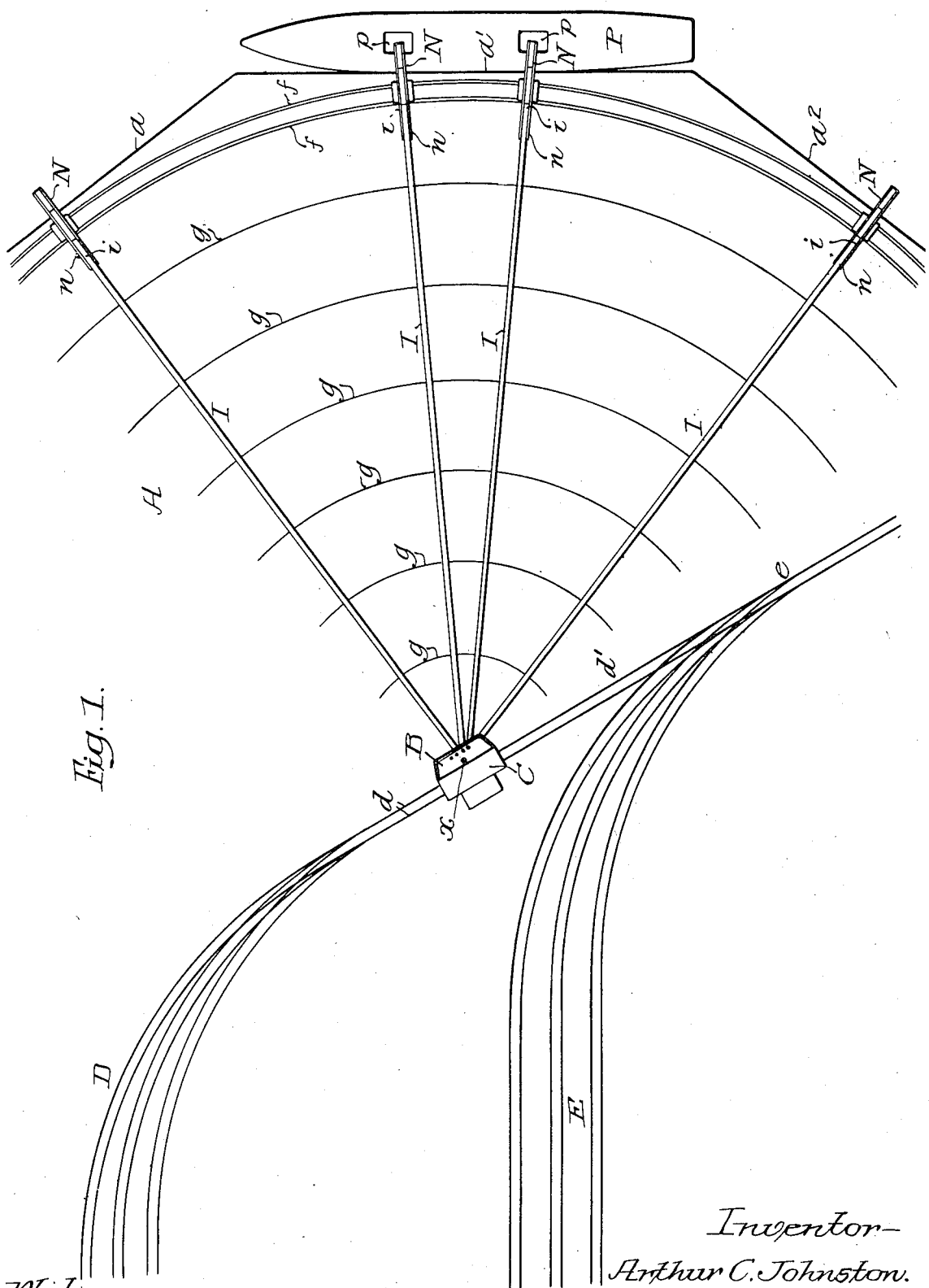

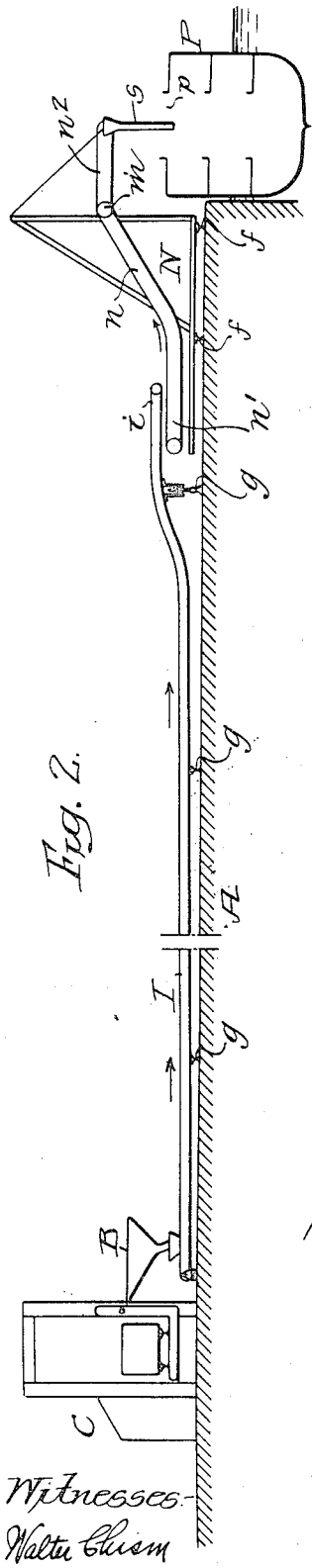
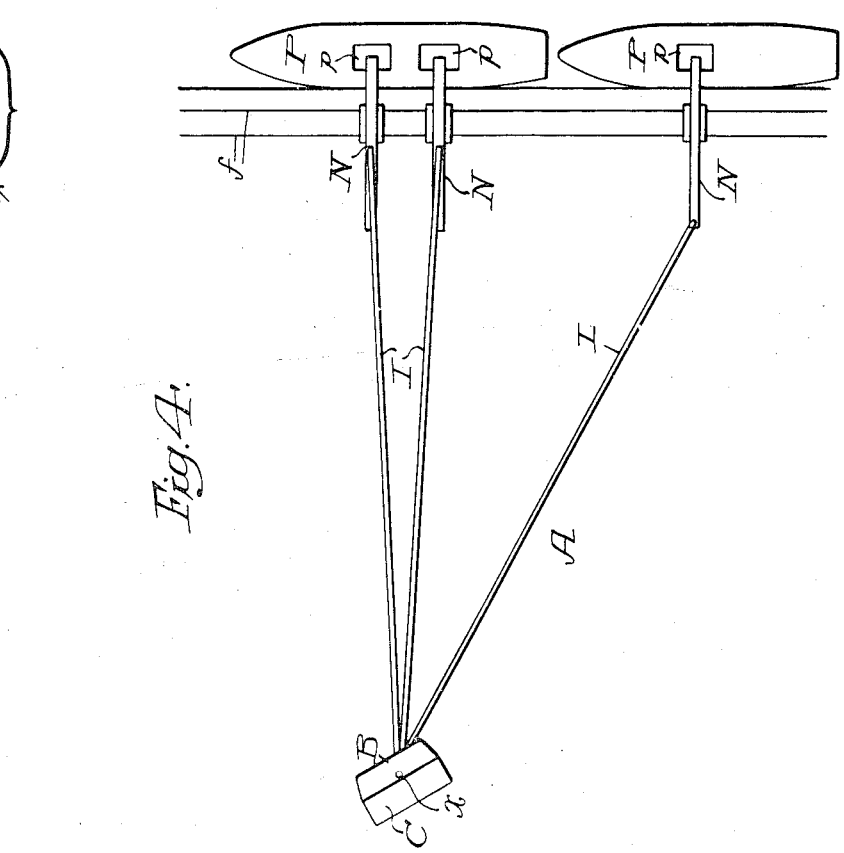
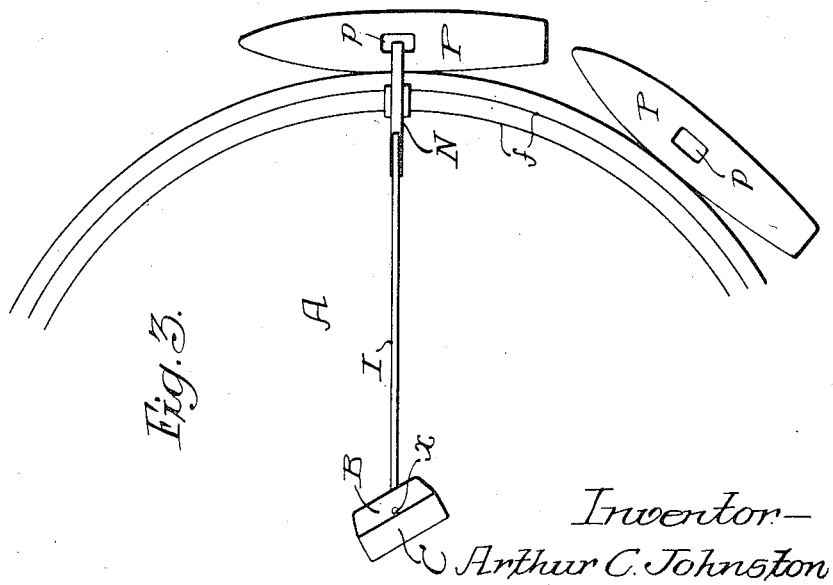

ARTHUR C. JOHNSTON, OF PHILADELPHIA, PENNSYLVANIA, ASSIGNOR TO THE J. M. DODGE COMPANY, OF NAUGATUCK, CONNECTICUT, A CORPORATION OF CONNECTICUT.

COAL-HANDLING APPARATUS.

1,069,431.

Specification of Letters Patent.

Patented Aug. 5, 1913.

Application filed July 3, 1912. Serial No. 707,431.

*To all whom it may concern:*

Be it known that I, ARTHUR C. JOHNSTON, a citizen of the United States, residing in Philadelphia, Pennsylvania, have invented certain Improvements in Coal-Handling Apparatus, of which the following is a specification.

My invention relates to certain improvements in apparatus for handling coal and like material.

The apparatus is particularly adapted for loading vessels with coal, although it will be understood that the invention can be used for loading coal onto other carriers.

One object of the invention is to simplify the construction of this type of apparatus and to construct the mechanism so that one or more vessels can be loaded from a given point, while moored at a dock.

A further object of the invention is to construct the apparatus in two sections so that it will accommodate itself to the vessel being loaded.

In the accompanying drawings: Figure 1, is a diagrammatic plan view illustrating my invention as located on a dock in which the bulkheads are arranged, one at an angle to another; Fig. 2, is an enlarged diagrammatic view in elevation; Fig. 3, is a diagrammatic view illustrating the invention applied to a dock having a segmental bulkhead; and Fig. 4, is a diagrammatic view of a modification of the invention applied to a dock having a straight bulkhead.

A is the dock, in the present instance, having three bulkheads $a$, $a'$, $a^2$, one arranged at an angle to another. Each bulkhead is the same distance from a point $x$, which is the pivot for the conveyer hereinafter described. The bulkheads are of sufficient length so that a comparatively long vessel can be moored at each bulkhead.

At one side of the center point $x$ is located the hopper B into which the coal is discharged from any suitable dumping apparatus C. The diagram view illustrates a type of apparatus in which the entire car is inverted and its contents discharged into the hopper. In the present instance, D are the storage tracks for the loaded cars and $d$ is a track leading from the storage tracks to the car dumping apparatus. This track is continued, as at $d'$, and is connected to the switch track $e$, leading to the storage tracks E for empty cars. The cars are transferred from the storage tracks D to the dumping apparatus C and the contents discharged into the hopper, after which they are transferred from the tracks $d'$ and $e$ to the storage tracks for empty cars.

I are four conveyers, in the present instance. These conveyers are pivoted at the point $x$ and terminate at their outer end at $i$ directly over the horizontal portion $n'$ of an auxiliary or boat loading conveyer N. Each conveyer I is made of a frame supporting an endless belt, which carries the coal from the hopper to the discharge end $i$. This frame has wheels adapted to rails $g$ on which the conveyer is supported so that each conveyer can readily swing on its pivot. The auxiliary conveyer consists of a frame having wheels adapted to rails $f$—$f$ near the bulkhead. The horizontal portion $n'$ is extended under the overhanging end $i$ of the pivoted conveyer I, while the outer end $n^2$ is pivoted at $m$ to the frame so that it can be raised and lowered. Depending from the outer end of the section $n^2$ is a leg $s$, which can enter the hold of the vessel through the hatchway, when the section $n^2$ is lowered. By this construction the coal can be directed to any point desired in the vessel.

The auxiliary conveyer N can be propelled by power or by hand, as desired, and the pivoted conveyer I can also be moved either by power or by hand. By providing a series of pivoted conveyers, as shown, to receive coal from one hopper a number of vessels can be loaded at the same time and the coal can be discharged into a vessel through two or more hatchways.

In Fig. 1, I have shown a vessel P having two hatchways $p$—$p$, with a supplemental conveyer N at each hatchway and a pivoted conveyer for discharging coal onto each supplemental conveyer, while the other two supplemental conveyers are in position to load vessels at the other bulkheads, if desired. By making the outer end $i$ of the pivoted conveyer overlap the horizontal section $n'$ of the auxiliary or boat loading conveyer, I am enabled to move the two conveyers to any position along any of the bulkheads without having to adjust either of the two conveyers except to move the auxiliary conveyer on its track to aline with the hatchway of the vessel to be loaded and to swing the conveyer I in position so that its end will extend over the horizontal portion of the conveyer N.

While in Fig. 1, I have shown a wharf having a series of bulkheads arranged at an angle, one to another, in Fig. 3, I have illustrated a segmental bulkhead and vessels can be located at any point desired, while in Fig. 4, I have illustrated a straight bulkhead. In this instance, the pivot point is far enough from the bulkhead so as to allow the pivoted conveyer to swing and yet discharge into the horizontal portion of the supplemental conveyer. In this instance, the horizontal portion of the supplemental conveyer can be made, if desired, of a greater length than that illustrated in the arrangement shown in Figs. 1 and 2.

It will be seen that I am enabled to provide a simple and effective apparatus for handling coal in large quantities; the coal being delivered at a central point from cars and transferred by means of conveyers to a vessel at a bulkhead of a dock and as the bulkhead will vary according to the location of the wharf and the railroad terminal facilities, the apparatus may necessarily be modified without departing from the essential features of the invention.

If a vessel, such as indicated by the letter P, is to be loaded with coal, it can be handled by conveyers; one or more of the auxiliary conveyers N being located in position opposite the hatchway or hatchways and the pivoted conveyers I are shifted so that the discharge end will overlap the portions $n'$ of the auxiliary conveyers. The cars, one after another, are then transferred to the dumping apparatus C and their contents discharged into the hopper B. A chute leads from the hopper to each conveyer I and the flow of coal through the chute may be regulated in any manner desired so that when power is applied the coal is carried by the conveyer belt, in the present instance, and discharged onto the belt $n$ of the auxiliary conveyer N and discharged through the leg into the hold of the vessel. This leg can be moved on its pivot to direct the coal to any point desired within the hold. The portion $n^2$ of the conveyer N with the legs can be raised clear of the vessel when it is desired to shift the auxiliary conveyer from one point to another or to allow the vessel to leave the wharf after being loaded. In small plants, a single pivoted conveyer I and a single auxiliary conveyer N may be used, but in large plants I prefer to duplicate these elements, as shown in Fig. 1 of the drawings.

While I have described the invention as particularly adapted for handling coal, it will be understood that it can be used for handling other materials which are to be transferred by conveyers from one point to another, and while I have described the auxiliary conveyer N as having a horizontal section $n'$, this horizontal section may be slightly inclined, without departing from the spirit of my invention.

I claim:

1. The combination in apparatus for handling coal, or like material, of a hopper; a conveyer arranged to swing in a horizontal plane; an independent auxiliary conveyer arranged to receive material from the free end of the main conveyer and to discharge it into a vessel, or other carrier; and a frame on which the auxiliary conveyer is mounted, said frame being movable independently of the main conveyer.

2. The combination in apparatus for handling coal, of a hopper; a conveyer pivoted to the hopper and arranged to move in a horizontal plane; an independent auxiliary conveyer having an extended receiving portion over which the end of the pivoted conveyer projects; and a frame on which the auxiliary conveyer is mounted; said frame being movable independently of the main conveyer.

3. The combination in apparatus for handling coal, of a hopper; a series of conveyers pivoted at the hopper; a bulkhead; a track at the bulkhead; a series of auxiliary conveyers mounted on the track and arranged to receive material from the pivoted conveyers and to deliver said material to vessels at the bulkhead.

4. The combination of a hopper; a conveyer pivoted at the hopper; a wharf having two or more bulkheads arranged one at an angle to another; an auxiliary conveyer at the bulkhead arranged to receive material from the pivoted conveyer and to deliver said material to a vessel at one of the bulkheads.

5. The combination of a hopper; a wharf having two or more bulkheads, one arranged at an angle to another; a series of conveyers pivoted at the hopper; a track extending along the bulkheads; a series of auxiliary conveyers mounted on the track and each having an extended horizontal portion at the rear over which the end of the pivoted conveyers project and each having a pivoted extension overhanging the bulkhead so as to discharge material into a vessel at the bulkhead.

6. The combination of a bulkhead; a conveyer pivoted at a point distant from the bulkhead and arranged to swing in a horizontal plane; a hopper at the pivot point for discharging coal into the conveyer; a track at the bulkhead; an auxiliary conveyer mounted on the track and having a rearwardly extending horizontal portion over which the discharge end of the pivoted conveyer projects and having a projecting portion overhanging the bulkhead so that coal delivered from the hopper will be transferred by the pivoted conveyer to the auxiliary conveyer and from the auxiliary conveyer to a vessel at the bulkhead.

7. The combination in apparatus for handling coal, of a wharf having an extended bulkhead; a pivoted conveyer; a hopper some distance back of the bulkhead; a belt conveyer pivoted at the hopper and laterally movable; a track at the bulkhead; an endless auxiliary conveyer mounted on the track and having a rearwardly extending horizontal portion underlapping the discharge end of the pivoted conveyer and having a pivoted section projecting beyond the bulkhead; with a leg suspended from the end of the said pivoted section so that coal discharged into the hopper will be transferred by the conveyers into the hold of a vessel at the bulkhead.

In testimony whereof, I have signed my name to this specification, in the presence of two subscribing witnesses.

ARTHUR C. JOHNSTON.

Witnesses:
WM. E. SHUPE,
WM. A. BARR.